United States Patent

[11] 3,615,969

| [72] | Inventor | Allan B. Hegg<br>Richmond, Va. |
|---|---|---|
| [21] | Appl. No. | 730,418 |
| [22] | Filed | May 20, 1968 |
| [45] | Patented | Oct. 26, 1971 |
| [73] | Assignee | Larson Industries Inc.<br>St. Paul, Minn. |

[54] FOAMED-CORE LAMINATES
7 Claims, 2 Drawing Figs.

[52] U.S. Cl. .................................................. 156/78, 156/79
[51] Int. Cl. ................................................. B32b 5/18
[50] Field of Search ................................... 156/78, 79

[56] References Cited
UNITED STATES PATENTS

| 2,642,920 | 6/1953 | Simon et al. .................. | 156/78 |
| 3,013,922 | 12/1961 | Fisher .......................... | 156/79 X |
| 3,080,267 | 3/1963 | Schmalz ....................... | 156/78 X |
| 3,124,626 | 3/1964 | Graham et al. ............... | 156/79 X |

*Primary Examiner*—Carl D. Quarforth
*Assistant Examiner*—S. R. Hellman
*Attorney*—Merchant & Gould

ABSTRACT: Foamed-core laminates or sandwiches useful in the construction of pleasure boats comprise one or more layers of plastic foam sandwiched between layers of reinforced polyester. The laminates can be prepared by spraying a liquid, foam-producing substance on one side of a reinforced polyester skin or shell and thereafter spraying a thin coating of polyester over the previously applied foam while the foam is hardening and still tacky. This polyester coating forms an adherent skin on the foam and acts to firmly bond the final layer of reinforced polyester (when such is applied) to the foam core.

PATENTED OCT 26 1971 3,615,969

INVENTOR.
ALLAN B. HEGG
BY
Merchant & Gould
ATTORNEYS

FOAMED-CORE LAMINATES

BACKGROUND OF THE INVENTION

Laminates (e.g. reinforced polyester laminates) are replacing homogeneous construction materials (e.g. wood and metal) to a greater and greater extent. Two of the reasons for the increasing use of structural laminates are the ease with which some of the laminates can be formed or molded into complex shapes and the high strength/weight ratios that can be obtained. The latter reason is particularly important because it permits structures of conventional design to be made stronger without any increase in weight. If no increase in strength is needed, the overall weight of the structure can be reduced.

Pleasure boats have been made from reinforced polyesters for some years by a process which involves the use of a female hull mold. After first applying a suitable mold release agent, a gel coat of polyester resin is applied to the surface of the mold cavity at a thickness of, for example, 10–20 mils. Next, one or more layers of a reinforcing material (e.g. chopped or woven fibers of glass) are applied over the gel coat and bonded thereto with the aid of additional polyester resin (e.g. as by using glass cloth saturated with polyester resin). When the polyester resin has hardened or cured, the resulting composite (i.e. a reinforced polyester shell or skin) can be removed from the mold and used as the boat hull.

More recently, it has been found that better quality boats can be obtained if the hulls are made as sandwich panels using two reinforced polyester skins or shells separated by a core of foamed plastic. This can be accomplished by a filling process which comprises forming two nestable hull-shaped shells or skins of reinforced polyester on two separate molds, placing the smaller of the two reinforced polyester shells inside the larger shell, holding the two shells in a spaced relationship (e.g. separated by three-fourths inch), and then blowing a foam-producing agent between the two shells which on hardening, forms a rigid or flexible cellular plastic core between the two shells. The cellular core can have opened or closed cells.

The use of two separate molds for forming the inner and outer skins or shells of polyester sandwich panels, particularly in the manufacture of boats, is uneconomical. Consequently, it is more common to prepare sandwich panels of this type by a process of superposition (i.e. the orderly fabrication of the layers). In this process, a glass reinforced polyester skin or shell is formed in a conventional female hull mold. Subsequently, one or more layers of a plastic foam are formed in place on the inside of this outer skin or shell. Finally, an inner reinforced polyester skin or shell is formed in place over the last applied layer of foam.

Some foam-producing agents will, on curing, firmly adhere to the inner and outer reinforced polyester skins or shells. However, other foam-producing agents do not form strong bonds with the reinforced polyester skins, and, as a consequence, their sandwiches must be held together by mechanical means (e.g. bolts) or by the use of adhesives.

At the present state of the art, polyurethane foam-producing agents are preferred. However, when the sandwich panels are prepared by a process of superposition, it has been found that the inner or last applied reinforced polyester skin does not firmly adhere to the previously applied and hardened foamed polyurethane core. Instead, the polyurethane foam develops a very smooth, slick surface or crust when it hardens. This smooth surface sheds, repels or rejects the polyester resin, thereby preventing a good bond at the interface between the polyester and the polyurethane. As a result, the overall strength of the sandwich is lower than desired and means must be provided for bonding the inner or last applied polyester skin to the remainder of the sandwich.

SUMMARY OF THE INVENTION

I have discovered that the inner or last applied polyester skin or shell can be firmly bonded to the foamed polyurethane core if the method of manufacture of the sandwich by the superposition process is altered to the extent of providing an additional step which involves the application of a thin coat of polyester resin to the last applied layer of polyurethane foam while that layer of polyurethane foam is still tacky (i.e. the urethane foam is only partially cured) and is doughy or plastic. By applying a thin coating of polyester resin to the last applied polyurethane foam while the latter material is still tacky and sometimes still foaming, the polyester coating and polyurethane foam are firmly bonded to each other when the two materials harden or cure to a tack-free state. This co-cured interfacial bond is partly mechanical and, I believe, partly chemical in nature. The tenaciously bonded coating of polyester resin then provides a suitable base or primer on which the inner or last applied reinforced polyester skin can be applied. The result of this improved process is the production of a firmly bonded, high strength, foamed core, reinforced polyester sandwich or laminate.

THE DRAWINGS

FIG. 1 is a plan view of a female hull mold for a boat.

FIG. 2 is a fragmentary sectional view of the hull mold of FIG. 1 taken along the lines 2—2. In this figure, the various layers which together form a foamed-core polyester boat hull are shown in the mold of FIG. 1. A portion of each of the layers is exposed for purposes of illustration, only.

DETAILED DESCRIPTION

The present invention is directed to an improved process for making foamed-core polyester sandwiches or laminates.

Although the laminates produced by the present process are useful as building materials in the building industry, as structural members in boats and aircraft, and in other applications, the present invention is hereinafter described with particular reference to the manufacture of boats. It is not intended that the present invention be limited to the manufacture of boats, but rather it is intended that the following description of the manufacture of boats serve to illustrate the practice of this invention.

a. The Process as Applied to Boats

Figure 1:
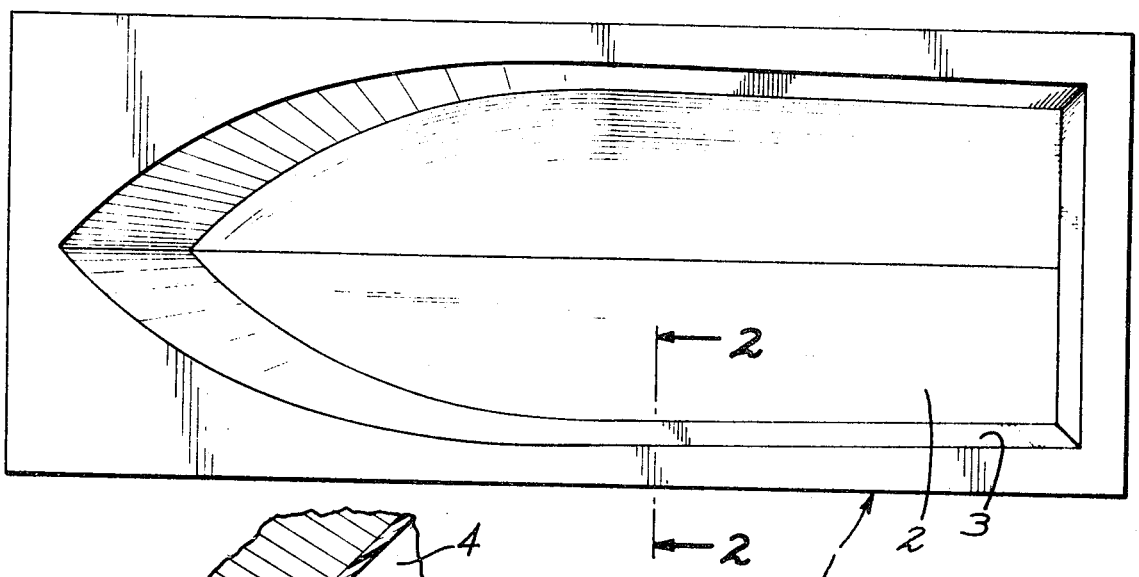
Figure 2:
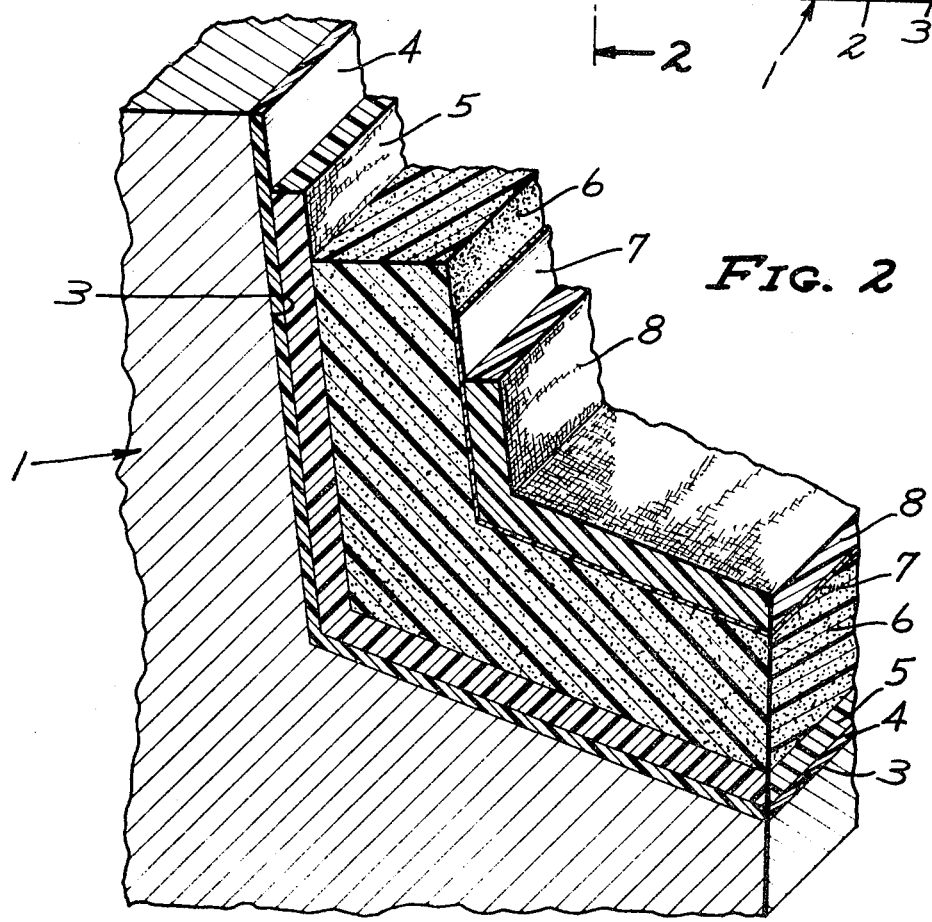

The following description is made with reference to the drawings in which FIG. 1 illustrates a typical female hull mold for a boat and FIG. 2 illustrates the construction of a boat hull according to this invention.

The manufacture of boats from reinforced polyesters typically involves the use of a female hull mold. Such a hull mold is shown in FIG. 1 by the numeral 1. Mold 1 includes a female cavity 2 which serves to define the exterior shape and surface of the boat hull. Although mold 1 has been shown in FIG. 1 as a single or unitary mold, the mold can be cut or subdivided into several smaller molds. Then, the hull can be prepared in several separate pieces or sections using these partial molds and the resulting sections of the boat hull can be bonded together to form a complete hull.

Turning now to FIG. 2, the manufacture of a plastic boat hull generally involves the preparation of the mold 1 by smoothing the inner or hull defining surface 3 and coating it with a suitable mold release agent (e.g. zinc stearate).

Next, a gel coat 4 of polyester resin is applied to the mold at a thickness of, for example, 10–20 mils. This gel coat provides a smooth exterior surface for the boat, permits the exterior of the boat to be uniformly colored by painting or through the use of dyes or pigments included with the polyester gel coat, prevents fibers of the reinforcing material (later applied) from protruding from the hull, and provides a resin rich surface on the boat.

Next, one or more layers of reinforced polyester 5 (e.g. woven glass fibers saturated with polyester) are applied over the gel coat 4. Woven, nonwoven, chopped or continuous glass fibers are generally used as reinforcing materials. Chopped glass fibers can be applied by the use of automatic spray guns. Glass fabrics (woven and nonwoven) can be applied over the gel coat or a previously applied later of reinforced polyester by saturating the glass fabric in polyester resin and then spreading the saturated fabric over the gel coat or other layer. Each succeeding coat or layer 5 of reinforced polyester is applied after the preceding layers have partially or, more preferably, completely hardened. Any general purpose polyester laminating resin can be used.

Next, one or more layers of foam 6 are formed on the outer reinforced polyester skin or shell (consisting, in this illustration, of layers 4 and 5). Improved bonds can often be obtained between the outer skin or shell and the foamed core if an air-inhibited polyester resin is used in making the outer shell and the foam-producing substance is applied over the polyester resin while the polyester is still tacky (i.e. going through the final stages of curing). Various foam-producing agents can be used. For example, foamed polyesters can be produced by the reaction between polyesters of relatively high acid or hydroxyl numbers and di- or polyisocyanate cross-linking agents such as hexamethylene di-isocyanate and toluene diisocyanate, all aided by suitable blowing agents (e.g. carbon dioxide or freon). Polyurethane foams can be produced by the reaction of diisocyanates and polyols (e.g. ethylene glycol) in the presence of water or suitable blowing agents. Foam 6 can be applied by spraying a liquid foam-producing agent over layer 5. The foam-producing agent then hardens in place to form a rigid or flexible (as desired) cellular foam having open or closed cells. Closed-cell foams are preferred for boat construction because of their added buoyancy.

It is the next step of the process that characterizes the present invention. In this step, a thin layer or coating of polyester resin 7 is applied over the last applied layer of foam 6 before the foam has completely hardened and while the foam is still tacky. Layer 7 of polyester resin can be conveniently applied with a spray gun as soon as the last layer of foam 6 has ceased the major part of its foaming activity and while some moderate foaming is still observable. When this polyester resin is applied by spraying to a foam that has "creamed over," some of the droplets of resin will puncture the crust of the foam. I believe these droplets of resin, on curing and hardening, serve to mechanically lock or interlock the polyester primer coating to the foamed core. Moreover, it appears that the polyester and the foam-producing substance interact (chemically), probably through the reaction of, for example, free-NCO groups with available hydroxyl groups on the polyester. In any event, the result is an adequate, co-cured interlocked, interfacial bond between the foamed core and the polyester coating. When the strength of the bond is tested by trying to peel or pull the polyester shell away from the foamed core (i.e. tested under tensile stress), the sandwich will fail or rupture in the foam and not at the interface between the foam and the polyester primer coating. The thickness of polyester resin layer 7 is not critical and it is only necessary that all or a major portion of the underlying layer of foam 6 be covered. A particularly useful amount is the minimum required to provide a complete coating or covering over foam 6 when layers 6 and 7 have both hardened.

Finally, one or more layers of reinforced polyester 8 are applied over resin coating 7 to provide the necessary or desired thickness and strength of the inner skin or shell of the polyester resin sandwich or laminate.

b. Polyester Resins

Polyester resins are well known in the art. Although all polyester resins do not serve with equal effectiveness, the selection of a suitable polyester resin is an act within the skill of the art.

The commercially important polyester molding resins are the polycondensation products of dicarboxylic acids and dihydric alcohols. Occasionally, these polyester resins are chemically modified with minor amounts of mono- and polyfunctional materials (e.g. i-stearic acid and pentaerythritol).

The polyesters generally used in the manufacture of boats and other products of this type are unsaturated polyesters characteristically containing ethylenic unsaturation

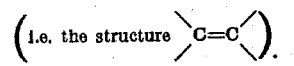

Ethylenic unsaturation can be and frequently is introduced into polyester resin molecules by the use of maleic or fumaric acids, or maleic anhydride in the manufacture of the resin. Unsaturated polyester resins can be cross-linked and hardened through the double bond of the ethylenic unsaturation using a compatible monomer also containing ethylenic unsaturation (e.g. styrene). Polyester resins, when catalyzed (e.g. catalyzed with benzoyl peroxide) will cure or harden at room temperature without the necessity of high pressures.

c. Reinforcing Materials

Although a variety of reinforcing materials are known, glass fibers are the most common. The selection of suitable glass fibers (e.g. chopped, woven or nonwoven fabrics, etc.) is within the skill of the art.

d. Foam-producing agents

Suitable foam-producing agents include those which produce polyurethane, polyester, and polystyrene foams. Such agents are known in the art. The present invention offers the most advantages in the preparation of sandwiches or laminates having foamed polyurethane cores because of the difficulties in otherwise obtaining a suitable bond between the inner polyester skin or shell and the cured polyurethane foam. Accordingly, polyurethane foam-producing agents are preferred.

The present invention is further illustrated by the following specific example. Unless otherwise indicated, all parts and percentages are by weight.

EXAMPLE 1

A female hull mold for an outboard runabout was selected for use. The hull was prepared in the following manner.

First, a 15 mil polyester resin gel coat was applied to the inner hull-defining surface of the mold. Next, a 45 mil layer of polyester resin reinforced with continuous, nonoriented glass fibers was applied over the gel coat. Next, a woven fiberglass mat, saturated with polyester resin, was applied over the previous layer of reinforced polyester. Next, four successive layers of polyurethane foam were applied by spraying. Each layer of foam was applied after the preceding layer had cured and hardened. Next, a thin layer (about 3–6 mils thick) of polyester resin was applied over the last layer of polyurethane foam while the foam was still tacky. At the time this layer of polyester resin was applied, some slight foaming of the last applied layer of foam could still be observed. The polyester was applied by spraying and some droplets of resin penetrated the crust of the foam. After the polyester resin coating had been applied over the last layer of polyurethane foam, the entire structure was permitted to cure or harden by aging at room temperature. Next a 45 mil. layer of nonwoven glass fibers (i.e. continuous rovings) saturated with polyester resin was applied over the thin primer coat of polyester resin and the entire structure permitted to harden (i.e. cure) by aging at room temperature.

When the hull had hardened, it was removed from the mold and the remainder of the boat was completed in a conventional manner. The boat was then water tested and performed satisfactorily.

Test samples of the polyester foam sandwich just described were prepared and tested. It was found that the inner or last applied reinforced polyester skin or shell was firmly bonded to the foamed core and the entire sandwich had improved strength and fabrication characteristics when compared to a foamed-core polyester sandwich prepared in the same manner from the same materials but omitting only the primer coat of polyester resin.

The polyester resin used in this example was a general purpose polyester laminating resin (sold by PPG Industries) cut in styrene and catalyzed.

Although the present invention has been described with a certain degree of particularity, it will be realized that numerous changes and modifications, falling within the spirit and scope of this invention, will become obvious to one routinely engaged in this art when aided by this disclosure.

For example, the polyester skins or shells can be made without the use of reinforcing materials if the added strength is not needed. Also, other or additional skin or shell-forming materials can be used (e.g. the polyester primer coating can be coated with a thermosetting acrylic copolymer).

What is claimed is:

1. In the preparation of a foamed-core laminate by the process of superposition wherein a plastic foam producing agent is applied to a surface of a first skin to thereby form a plastic foam and thereafter a second skin is formed over said plastic foam, the improvement which comprises the intermediate step of
   a. applying a thin coating of polyester resin over said applied foam producing agent before said foam has completely hardened and while the foam is still tacky.

2. Processes of claim 1 wherein the first and second skins are polyester skins.

3. Processes of claim 2 wherein:
   a. the first skin is a glass reinforced, air inhibited polyester resin skin;
   b. the second skin is a glass reinforced polyester skin; and
   c. the foam-producing agent is applied to the first skin while the air-inhibited polyester resin is still tacky.

4. Processes of claim 3 wherein said plastic foam is a polyester foam.

5. Processes of claim 3 wherein said plastic foam is a polyurethane foam.

6. Processes of claim 5 wherein said thin coating of polyester is applied by spraying with sufficient force to cause some sprayed droplets of polyester resin to penetrate the crust of the tacky foam.

7. Processes of claim 6 wherein a boat hull is produced.

* * * * *